(12) United States Patent
Dressel et al.

(10) Patent No.: US 10,414,104 B2
(45) Date of Patent: Sep. 17, 2019

(54) METHOD FOR ARRANGING A FUNCTIONAL LAYER ON A PLASTIC COMPONENT, AND A COMPOSITE MADE THEREOF

(71) Applicant: HELLA GmbH & Co. KGaA, Lippstadt (DE)

(72) Inventors: Jennifer Dressel, München (DE); Matthias Hahn, Lippstadt (DE); Sven Kinkel, Borchen (DE); Martin Mügge, Geseke (DE)

(73) Assignee: HELLA GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 15/911,741

(22) Filed: Mar. 5, 2018

(65) Prior Publication Data
US 2018/0250887 A1    Sep. 6, 2018

(30) Foreign Application Priority Data
Mar. 3, 2017    (DE) .......................... 10 2017 104 433

(51) Int. Cl.
*B29C 65/78*    (2006.01)
*B29C 65/08*    (2006.01)
(Continued)

(52) U.S. Cl.
CPC .......... *B29C 65/7847* (2013.01); *B29C 65/08* (2013.01); *B29C 65/081* (2013.01); *B29C 66/112* (2013.01); *B29C 66/114* (2013.01); *B29C 66/53* (2013.01); *B29C 66/5346* (2013.01); *B29C 66/81241* (2013.01);
(Continued)

(58) Field of Classification Search
USPC ..... 156/73.1, 285, 305, 307.1, 307.3, 308.2, 156/308.4, 309.6, 324.4
See application file for complete search history.

(56) References Cited

U.S. PATENT DOCUMENTS 3,357,091 A * 12/1967 Reissmueller .... H01L 21/67144
228/105
7,173,677 B2 * 2/2007 Kitamura ............. G02B 6/0065
349/58

(Continued)

FOREIGN PATENT DOCUMENTS

DE    10 2007 053 399 A1    5/2009
DE    10 2013 206 043 A1    10/2014

*Primary Examiner* — Sing P Chan
(74) *Attorney, Agent, or Firm* — Muncy, Geissler, Olds & Lowe, P.C.

(57) ABSTRACT

A method for arranging a functional layer on a plastic component of a lighting device and a composite made of the plastic component and the functional layer, in particular a frame, an outer rim, a support frame, an inner lens, a retaining element, or the like is provided. The method includes that a film-like laminar composite is provided that has the functional layer and a substrate. The laminar composite is placed in a holding fixture. A vacuum is turned on in the holding fixture and suctioning of the laminar composite by means of a suction area of the holding fixture is performed. The plastic component is arranged on the laminar composite, and at least areas of the laminar composite are welded or bonded to the plastic component by means of a welding method or by means of an adhesive method.

9 Claims, 3 Drawing Sheets

(51) Int. Cl.
*B29C 65/00* (2006.01)
*F21S 43/27* (2018.01)
*F21S 43/20* (2018.01)
*F21S 43/50* (2018.01)
*B29L 11/00* (2006.01)
*B29L 31/00* (2006.01)
*B29C 65/48* (2006.01)
*B29L 31/30* (2006.01)

(52) U.S. Cl.
CPC .......... *B29C 66/8322* (2013.01); *F21S 43/26* (2018.01); *F21S 43/27* (2018.01); *F21S 43/50* (2018.01); *B29C 65/48* (2013.01); *B29L 2011/0016* (2013.01); *B29L 2031/3055* (2013.01); *B29L 2031/747* (2013.01)

(56) References Cited

U.S. PATENT DOCUMENTS

| | | | | |
|---|---|---|---|---|
| 7,307,674 B2* | 12/2007 | Kitamura | G02B 6/0065 | 349/58 |
| 7,422,345 B2* | 9/2008 | Lin | H01L 33/483 | 359/516 |
| 7,755,292 B1* | 7/2010 | Tuma | G01J 3/10 | 313/238 |
| 2002/0135833 A1* | 9/2002 | Murray Clube | G03F 7/70408 | 359/32 |
| 2002/0142227 A1* | 10/2002 | Dhar | G03F 7/001 | 430/1 |
| 2002/0149712 A1* | 10/2002 | Kitamura | G02B 6/0065 | 349/58 |
| 2002/0163681 A1* | 11/2002 | Taggi | G03H 1/202 | 359/12 |
| 2002/0196517 A1* | 12/2002 | Nimura | G02F 1/133553 | 359/245 |
| 2005/0117356 A1* | 6/2005 | Lin | H01L 33/483 | 362/456 |
| 2007/0024938 A1* | 2/2007 | Clube | G03F 7/70791 | 359/12 |
| 2007/0081112 A1* | 4/2007 | Kitamura | G02B 6/0065 | 349/65 |
| 2007/0121031 A1* | 5/2007 | Kitamura | G02B 6/0065 | 349/65 |
| 2008/0032114 A1* | 2/2008 | Squires | B32B 27/12 | 428/308.4 |
| 2008/0038058 A1* | 2/2008 | Forrer | E01F 9/553 | 404/14 |
| 2010/0195175 A1* | 8/2010 | Flynn | G03H 1/0236 | 359/2 |
| 2011/0130062 A1* | 6/2011 | Squires | B32B 7/02 | 442/327 |
| 2013/0301090 A1* | 11/2013 | Flynn | G03H 1/20 | 359/2 |
| 2014/0027054 A1* | 1/2014 | Yoshihara | B29C 65/1432 | 156/273.3 |
| 2014/0098563 A1* | 4/2014 | Kim | G02B 6/0076 | 362/606 |
| 2014/0170536 A1* | 6/2014 | Fukugami | G03F 1/24 | 430/5 |
| 2014/0273306 A1* | 9/2014 | Raghunathan | H01L 22/10 | 438/15 |
| 2014/0320992 A1* | 10/2014 | Denkmann | B29C 65/085 | 359/883 |
| 2015/0293495 A1* | 10/2015 | Adkins | G03H 1/0011 | 359/10 |

* cited by examiner

METHOD FOR ARRANGING A FUNCTIONAL LAYER ON A PLASTIC COMPONENT, AND A COMPOSITE MADE THEREOF

This nonprovisional application claims priority under 35 U.S.C. § 119(a) to German Patent Application No. 10 2017 104 433.7, which was filed in Germany on Mar. 3, 2017, and which is herein incorporated by reference.

BACKGROUND OF THE INVENTION

Field of the Invention

The present invention relates to a method for arranging a functional layer on a plastic component of a lighting device, in particular a frame, an outer rim, a support frame, an inner lens, a cover plate, a retaining element, or the like, wherein the functional layer includes a hologram, in particular.

Description of the Background Art

Modern headlights and taillights for motor vehicles are both functional and stylistic, contributing substantially to the overall appearance of a vehicle. The functions prescribed by law are provided by refractive optical systems such as reflectors, lenses, TIR elements, or optical waveguides, and are implemented as complex systems with a multiplicity of components. In addition to the known refractive optics, increasing use will also be made in future of diffractive or holographic optics, which it was not practical to employ prior to the utilization and ongoing development of LED light sources and laser light sources. Holographic optics may be implemented equally well as a surface structure on a component or as so-called volume holograms by means of a photopolymer layer as the carrier of the holographic information.

In addition, there are diffractive optical films with different scattering characteristics that are used as optical scatterers or diffusers in optical systems and can also be used to form a defined light distribution, including in lighting systems of vehicles, or decorative films serve for stylistic implementation of components.

Plastic components with an applied functional layer having a hologram thus already find application, and will in future find application in lighting devices for vehicles as well, in particular in order to be used as optical elements and/or to fulfill additional design functions and to improve the visual appearance of the lighting device. Lighting devices for vehicles primarily have functional properties, although additional stylistic requirements for individualizing lighting devices are arising recently as well, for example for the signature of a vehicle. In this regard the lighting functions such as, e.g., low-beam headlight, high-beam headlight, bend lighting, and cornering light, must be provided, or signaling functions such as, e.g., taillight, brake light, directional indicator, back-up light, and rear fog light, and also as a reflector, must be able to indicate the current vehicle state, wherein lighting devices can additionally comprise design elements such as individually structured or printed surfaces, wherein holograms also find application for the signature of headlights or taillights.

For example, DE 10 2007 053 399 A1 discloses a lighting device with a hologram that forms a movable beam-forming part that represents a component for adapting a light guide. Holograms are also increasingly being used for decorative purposes as well, for example to fulfill design functions in addition to technical functions. In particular, holograms that are placed in functional layers may be employed. The functional layers must be mounted on a substrate, for example a transparent plastic body. In this case, the plastic body can advantageously constitute a lens of the lighting device, or the plastic body constitutes a frame, a mounting frame, a support frame, an internal illuminated component such as an auxiliary lens, a reflector, or an opaque visible surface, or the like. The particular feature here is that the plastic body can be covered with the functional layer comprising the hologram from the side that is visible to an observer from the outside of the lighting device. It is also possible to suspend the functional layer in a frame-like plastic component and illuminate it either with a reflected light method or by rear illumination.

In the future, the technology of holography will thus be used increasingly for lighting devices as well, with use in particular as optical and/or graphic elements in lighting devices. Holograms can be created or written by analog means from a real object, or can be prepared as computer-generated holograms. Computer-generated holograms can therefore represent any desired luminous area, signature, object, or the like, since the holographic image that is recorded in the holographic medium as illumination information can be designed in any manner desired.

DE 10 2013 206 043 A1 discloses a manufacturing process for a component in which a tool die having a hologram negative acts on the component, and the hologram is thus embossed onto the component by the action of the manufacturing tool as an integral part of the manufacturing process. The method is advantageous in that it is possible to guarantee protection from counterfeiting with holograms permanently integrated onto components. Furthermore, partial individualization of interior and outer shell components, for example vehicle components, can be achieved. It is disadvantageous that the production of the tool is cost-intensive and inflexible with regard to the production of the combination of a hologram and a plastic component. Moreover, the effects achievable with this method are less pictorial and have a less three-dimensional effect as compared to photopolymer holograms. Known applications for these production methods are films with holograms for security features for, e.g., banknotes, product labels, or identity cards.

Functional layers into which holograms are introduced have only a very slight thickness, for example less than 100 µm. As a general rule, such thin layers are applied as a coating to the substrate, for example to a backing film or to the plastic body for producing the plastic component. Since the photopolymer layer as a light-sensitive layer must be protected from unintended exposure to light through appropriate packaging and appropriate handling until it is used for a process of recording the holographic information, a film technology is better and simpler in the production process than a coated plastic body

SUMMARY OF THE INVENTION

It is therefore an object of the present invention to provide a method for arranging a functional layer on a plastic component of a lighting device, wherein the functional layer is to be applied to the plastic component or combined therewith in a simple and economical manner. In particular, a composite is to be formed with the functional layer and the plastic component that is resistant as a whole to damage and wherein the very thin and sensitive functional layer is to be protected.

According to an exemplary embodiment of the invention, the method provides at least the following steps: providing a laminar composite comprising the functional layer and a substrate; placing the laminar composite in a holding fixture; turning on a vacuum in the holding fixture and suctioning of the laminar composite by means of a suction area of the holding fixture; arranging the plastic component on the laminar composite; and/or joining at least areas of the laminar composite to the plastic component by means of a welding method or adhesive method.

Welding methods, in particular ultrasonic welding methods, can advantageously be adapted with regard to many parameters such that it becomes possible to weld the very sensitive and thin functional layer without damaging it in the intended useful lighting area. A concept of the invention includes that the functional layer is first joined together with a substrate into a laminar composite, so that the laminar composite as a whole is more durable, especially when the substrate has a significantly greater thickness than the functional layer with a recorded hologram. The handling of the laminar composite and the welding of the laminar composite to the plastic component can take place in this case with parameters that are likewise used for an essentially common ultrasonic welding method. For the welding, the larger, more sturdy plastic component is accommodated in a sonotrode and is pressed against the laminar composite, which is already resting on the suction surface of the holding fixture with vacuum. The welded joint can thus be created, in particular at the edge, by means of the ultrasonic welding method in that the ultrasonic vibration is created with the sonotrode against the holding fixture, so the holding fixture forms a sort of anvil. By means of the vacuum through the suction surface, the laminar composite is drawn onto the holding fixture strongly enough that the handling of the laminar composite completely parallels the handling of the sturdy holding fixture. Once the welded joint is produced, the plastic component is released from the receptacle of the sonotrode and the vacuum is turned off so that the finished composite formed of the plastic component and welded-on laminar composite can be removed.

In particular, provision can be made that the laminar composite is placed in the holding fixture with an orientation in which the substrate faces in the direction of the suction surface and thus the functional layer is adjacent to the weld region of the plastic component. Alternatively, it is possible that the laminar composite is placed in the holding fixture with an orientation in which the functional layer faces in the direction of the suction surface and the substrate is adjacent to the plastic component. For example, the functional layer has a thickness of 10 µm to 60 µm, and the substrate has, e.g., a thickness of 50 µm to 400 µm. Consequently, welding of all the layers can take place independently of the orientation of the laminar composite in its arrangement on the suction surface of the holding fixture, so that even when the functional layer rests against the plastic component, the substrate is likewise welded as well. The reason for this resides, in particular, in the especially small thickness of the functional layer.

According to an embodiment of the method according to the invention, the welding of at least areas of the laminar composite is carried out under an elevated temperature relative to the plastic component. To this end, provision can be made in particular that at least the suction surface of the holding fixture is heated before and/or during the welding of at least areas of the laminar composite to the plastic component, in particular by means of a heating unit that is present in the holding fixture. When the laminar composite cools off after the completed welding process and the removal of the composite having the plastic component and the laminar composite, a mechanical stretching of the laminar composite on the plastic component takes place, since the laminar composite shrinks due to the cooling. One result is a smooth, ripple-free surface of the welded laminar composite for high-quality implementation of a holographic function.

An especially good result is achieved in particular when the weld seam is continuous, so that the plastic component forms a welding frame that holds the full perimeter of the films. As a result of the cooling of the laminar composite after the welding, and in particular after the shutoff of the vacuum and the removal of the composite, a stretching occurs of the laminar composite in its arrangement on the plastic component. This achieves a wrinkle-free arrangement of the laminar composite, and thus of the functional layer, on the plastic component in order to create a reproducible and appealing, decorative appearance of the hologram.

According to an embodiment of the method, the suction surface of the holding fixture is provided with a porous metal body through which a full-area vacuum can be created at the laminar composite. Alternatively, it is also possible to implement a solid material with a relatively large number of suction bores through which the laminar composite is suctioned onto the suction surface. A porous metal body, in particular a porous aluminum, preferably an aluminum foam known under the brand name Metapor, makes it possible to create a full-area vacuum to suction on the layers.

For example, a full-area plastic component, such as a lens, can be used for arrangement on the laminar composite, wherein the laminar composite is suspended on and welded to the plastic component by means of a web, so that a spacing is created between the full-area plastic component and the laminar composite. The web can be incorporated in the plastic component in a continuous form, for example, and implemented along the continuous welding frame, so that the web is made to overlap the continuous welding frame of the holding fixture when the laminar composite is arranged between the continuous welding frame and the web. When the plastic component is pressed onto the holding fixture, the web is also pressed onto the continuous welding frame of the suction device, and the films of the laminar composite seal the suction surface of the holding fixture. After the execution of the welding process with the ultrasonic welding method and the removal of the composite formed of the plastic component and the laminar composite, the laminar composite can cool off and the full-area tension is established in the laminar composite, wherein as a result the laminar composite is suspended at a distance from the surface of the plastic component by the web.

It is also possible that a frame-like plastic component is used so that the laminar composite is freely suspended in the frame-like plastic component after the welding. Especially when the plastic component constitutes a support frame, an outer rim, or the like, with a suitable opening, the option is created of using the laminar composite with the functional layer comprising the hologram to best advantage in the transmissive method. This embodiment is advantageously suitable for reducing the weight of the assembly.

The invention also relates to a composite of a functional layer and a plastic component of a lighting device, in particular a frame, an outer rim, a support frame, an inner lens, a retaining element, or the like, and wherein the functional layer includes a hologram, in particular. According to the invention, the functional layer forms a laminar composite with a substrate, wherein the laminar composite is welded at least in areas to the plastic component by means of a welding method or adhesive method. In this design, provision is made in particular that the laminar composite is arranged suspended on the plastic component under a full-area preloading. The plastic component has, in particular, a continuous web with a closed contour, so that the laminar composite comprising the functional layer with the hologram is suspended in a frame-like manner by means of the web, wherein the inner surface defined by the continuous web with the closed contour allows free suspension of the laminar composite under a preloading.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
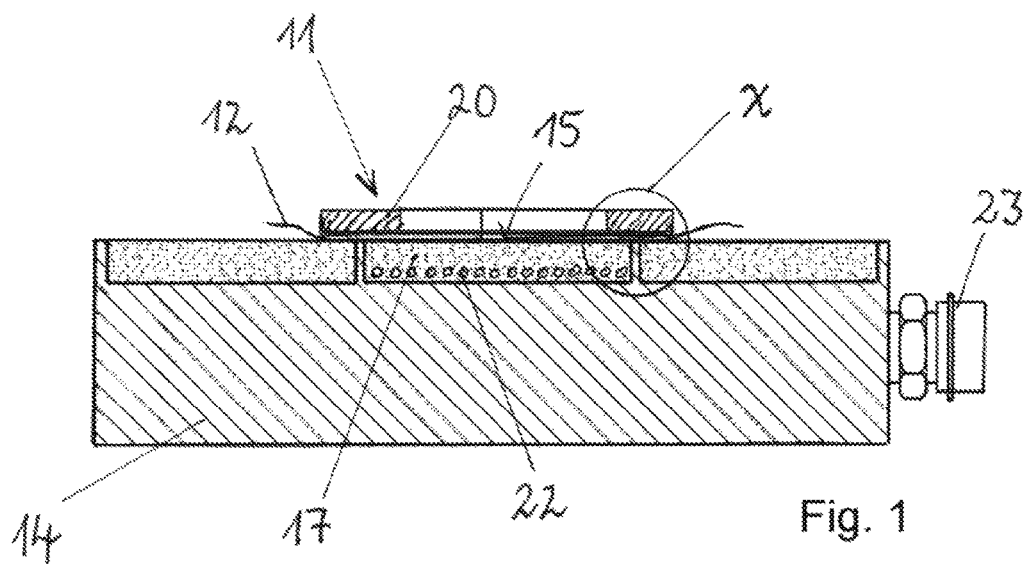
FIG. 1 is a cross-sectional view through a holding fixture with a laminar composite arranged on the top, and a plastic component arranged thereupon.

FIG. 1 shows a holding fixture 14 in cross section. Located on the top of the holding fixture 14 is a porous metal body 17, wherein the upward-facing free surface of the porous metal body 17 forms a suction surface 15. Applied to the suction surface 15 is a laminar composite 12, which makes full-area contact with the suction surface 15. Above the laminar composite 12 is located a plastic component 11 that comprises a frame cross-section 20.

The holding fixture 14 has a vacuum connection 23, with which a vacuum can be produced in the porous metal body 17. The laminar composite 12 is drawn against the suction surface 15 of the porous metal body 17 by the vacuum, so that the laminar composite 12 clings tightly to the suction surface 15.

The plastic component 11 can be accommodated in a sonotrode. With a vertically directed normal force applied to the suction surface 15, the plastic component 11 is set into a preferably lateral oscillatory motion with the sonotrode. Due to the oscillatory motion, an ultrasonic welding is achieved between the laminar composite 12 and the plastic component 11.

Figure 2:
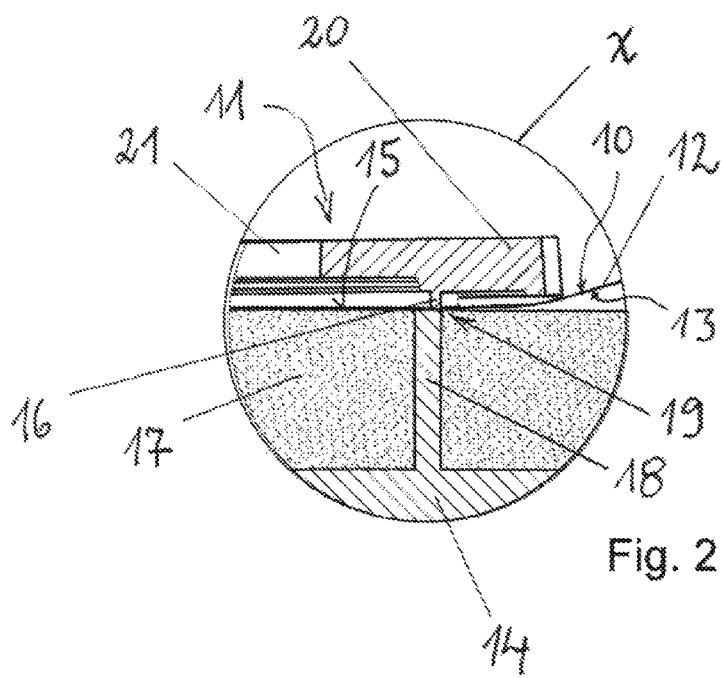
FIG. 2 is a detail view of X from FIG. 1.

In order to heat up the laminar composite 12 before and/or during the welding, the holding fixture 14 has a heating unit 22, which is schematically shown in the form of heating wires. The entire laminar composite 12 within the continuous weld region is heated uniformly due to the heatable holding fixture. In particular, in this case the region where the weld seam is produced between the laminar composite 12 and the plastic component 11 is heated. The detail X is shown enlarged in FIG. 2, which follows.

In the detail X, a section of the arrangement of the plastic component 11 with the frame cross-section 20 on the holding fixture 14 is shown. The holding fixture 14 includes the porous metal body 17, the top of which forms the suction surface 15. The laminar composite 12, comprising a functional layer 10 and a substrate 13, rests flat on the suction surface 15 of the porous metal body 17. Formed on the plastic component 11 is a web 16, which preferably can form a continuous, closed contour. The web 16 seals against a solid contact edge 18, together with the composite located therebetween, wherein the contact edge 18 simultaneously encloses a portion of the porous metal body 17, which can thereby produce a vacuum with which the laminar composite 12 can be drawn against the suction surface 15.

When the plastic component 11 is set in oscillation with a sonotrode, the face of the web 16 welds to the laminar composite 12. The web 16 is implemented as a continuation of the frame cross-section 20, wherein the frame cross-section 20 surrounds an opening 21. If the composite composed of the plastic component 11 and the laminar composite 12 is removed from the suction surface 15 after the welding in that the vacuum is switched off, then the laminar composite 12 within the web 16 shrinks upon cooling due to thermally induced changes in length, and stretches in consequence, so that the stretched region of the laminar composite 12 with the functional layer 10 closes off the portion of the opening 21 of the plastic component 11. If a hologram is recorded in the functional layer 10, it can be viewed, in particular through the opening 21 of the plastic component 11, or the hologram is illuminated, in particular from the rear, through the opening 21.

The weld 19 is formed only between the web 16 and the laminar composite 12 in this process, wherein the functional layer 10 faces in the direction of the web 16 by way of example. It is likewise possible that the laminar composite 12 rests on the suction surface 15 in the reverse manner, so that the substrate 13 faces in the direction of the web 16. It is possible in both positions for the laminar composite 12 to be welded to the web 16 of the plastic component 11, wherein both film-like layers of the laminar composite 12, which is to say the functional layer 10 and the substrate 13, can be locally melted and welded during the welding process.

Figure 3:
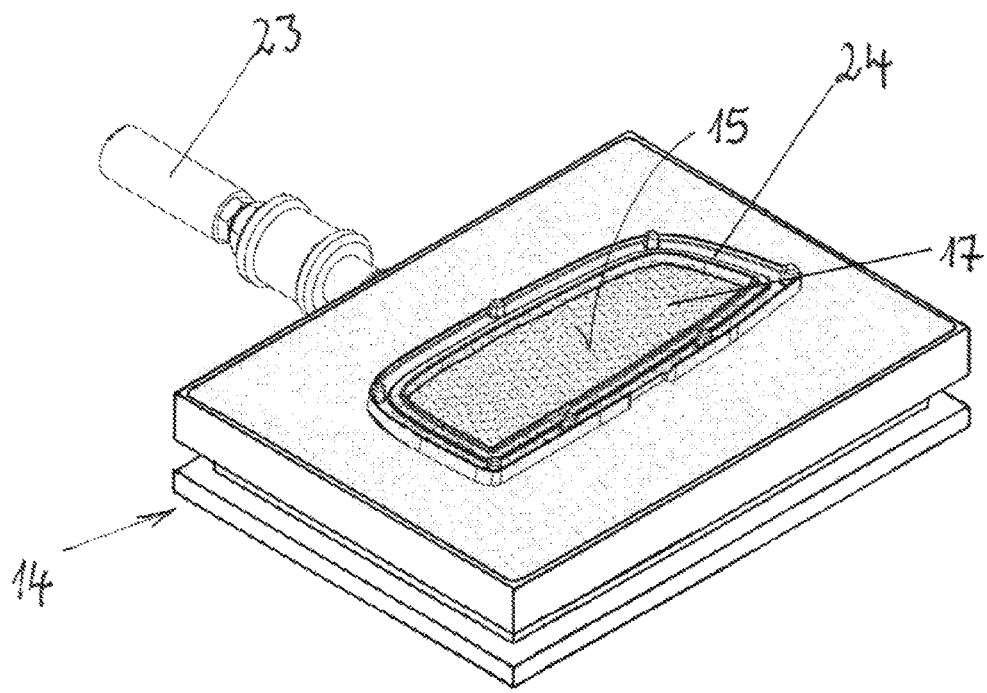
FIG. 3 is a perspective view of the holding fixture.

FIG. 3 depicts the holding fixture 14 with the porous metal body 17 and with a continuous welding frame 24 in a perspective view, wherein the suction surface 15 is formed on the top of the porous metal body 17 and is enclosed by the continuous welding frame 24 under the overlying plastic component 11. A suction effect can be produced on the suction surface 15 with the vacuum connection 23, because even though the porous metal body 17 does essentially form a flat surface, a full-area suction effect on the suction surface 15 can nevertheless be achieved due to the porous properties of the metal body 17. For this purpose, the vacuum connection 23 is connected to the porous metal body 17 by a vacuum connection. The continuous welding frame 24 in this case is made to overlap the web 16 of the plastic component 11, wherein the laminar composite 12 is arranged between the web 16 and the welding frame 24 when the plastic component 11 is arranged on the welding frame 24, as is shown in cross-section in FIG. 2.

Figure 4:
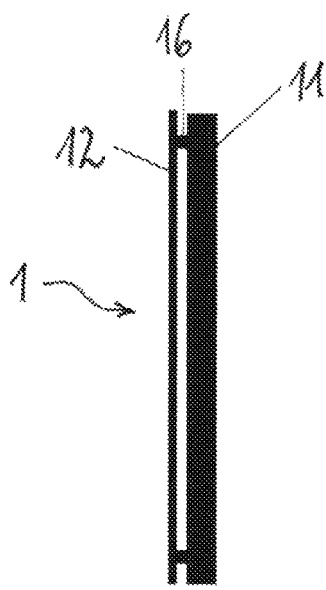
FIG. 4 illustrates am exemplary embodiment of a composite made of a plastic component with a laminar composite, wherein the plastic component is full-area in design.

FIG. 4 shows an exemplary embodiment of a plastic component 11 with a full-area design. The laminar composite 12 comprising the functional layer is held at a distance from the surface of the plastic component 11 by means of the web 16. In this way a composite 1 is formed that can form a lens or an inner lens as the plastic component 11, for example.

Figure 5:
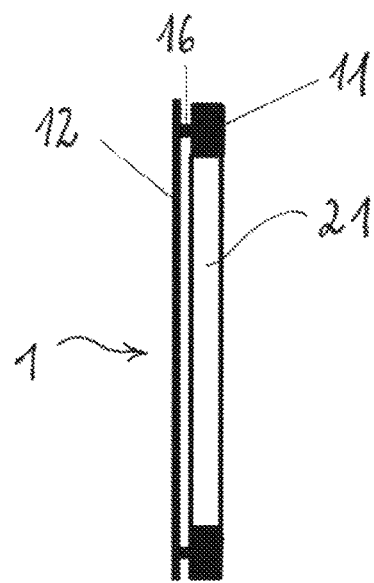
FIG. 5 illustrates an exemplary embodiment of the composite with a laminar composite and a plastic component, wherein the plastic component is designed to be frame-like and to have an opening.

FIG. 5 shows, in a variation from FIG. 4, the composite 1 includes the laminar composite 12 with the functional layer, wherein the laminar composite 12 is arranged at a distance from the plastic component 11 by the web 16. The plastic component 11 has an opening 21 so that the laminar composite 12 with the photopolymer, and including the hologram, can be used within a frame.

Figure 6:
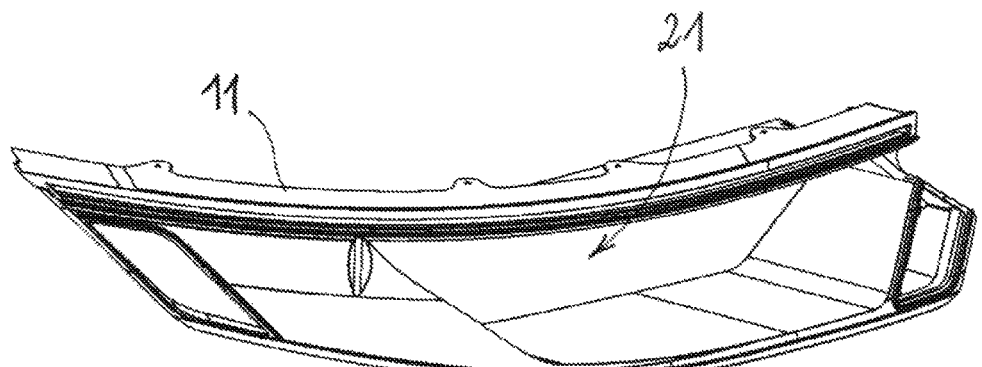
FIG. 6 is a perspective view of the plastic component with an opening for arranging a laminar composite comprising a functional layer.

FIG. 6 shows an exemplary embodiment of a plastic component 11 in the form of a frame of a taillight with an opening 21.

Figure 7:
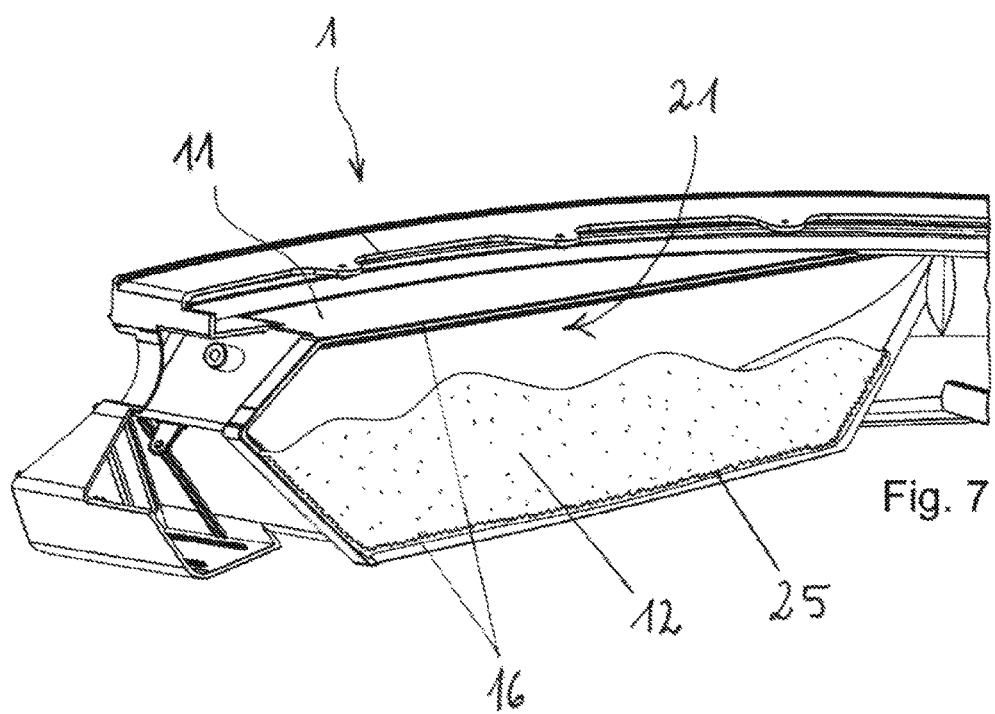
FIG. 7 is a composite made of the plastic component from FIG. 6 and a laminar composite comprising the functional layer, wherein the laminar composite is represented as only partially arranged in the opening.

FIG. 7 shows the plastic component 11, wherein a laminar composite 12 is welded into the opening 21 by a weld seam 25, wherein the weld seam 25 runs along the web 16. The laminar composite 12 is partially shown in order to better illustrate the arrangement in the opening 21. In this way, an example of a composite 1 is depicted that has a plastic component 11 in the form of a frame, wherein the frame serves as a support frame for a laminar composite 12 with a functional layer that includes a hologram that can be viewed from the outside of the taillight of a vehicle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for arranging a functional layer on a plastic component of a lighting device, a frame, an outer rim, a support frame, an inner lens, a cover plate, or a retaining element, the method comprising:

providing a film-like laminar composite comprising the functional layer and a substrate;
placing the laminar composite in a holding fixture;
turning on a vacuum in the holding fixture;
suctioning the laminar composite via a suction area of the holding fixture;
arranging the plastic component on the laminar composite; and
welding or bonding at least areas of the laminar composite to the plastic component via welding or an adhesive.

2. The method according to claim 1, wherein a photopolymer layer comprising at least one hologram or decorative film or diffractive optical film is provided as the functional layer.

3. The method according to claim 1, wherein the laminar composite is placed in the holding fixture with an orientation in which the substrate faces in a direction of the suction surface.

4. The method according to claim 1, wherein the laminar composite is placed in the holding fixture with an orientation in which the functional layer faces in a direction of the suction surface.

5. The method according to claim 1, wherein the welding or bonding of at least areas of the laminar composite to the plastic component is carried out under an elevated temperature of the laminar composite relative to the plastic component.

6. The method according to claim 1, wherein the suction surface of the holding fixture is provided with a porous metal body through which a full-area vacuum is created at the laminar composite.

7. The method according to claim 1, wherein a full-area plastic component is used for arrangement on the laminar composite, wherein the laminar composite is suspended on and welded or bonded to the plastic component via a web, so that a spacing is created between the full-area plastic component and the laminar composite.

8. The method according to claim 1, wherein a frame-like plastic component is used so that the laminar composite is freely suspended in the frame-like plastic component after the welding or bonding.

9. The method according to claim 1, wherein a tension is created in the laminar composite in an arrangement of the laminar composite on the plastic component through cooling of the laminar composite after the welding.

* * * * *